W. JONES.
Hay-Fork.
No. 18,047.
Patented Aug. 25, 1857.
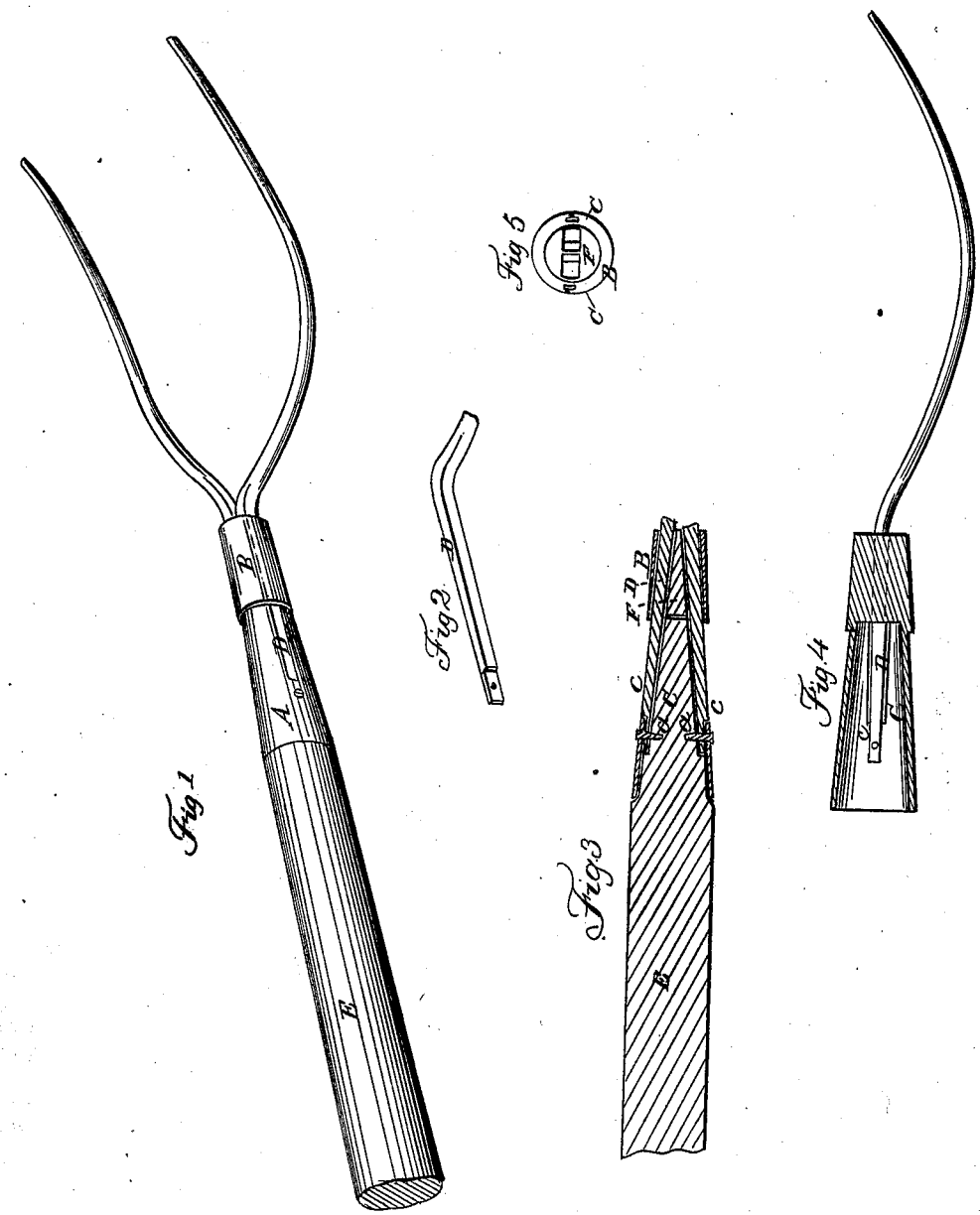

UNITED STATES PATENT OFFICE.

WILLIAM JONES, OF SPEEDSVILLE, NEW YORK.

IMPROVEMENT IN HAY AND MANURE FORKS.

Specification forming part of Letters Patent No. 18,047, dated August 25, 1857.

*To all whom it may concern:*

Be it known that I, WILLIAM JONES, of Speedsville, in the county of Tompkins and State of New York, have invented a certain new and useful Improvement in Hay and Manure Forks, of which the following is a full, clear, and exact description, reference being had to the accompanying drawings, in which—

Figure 1 represents a view in perspective of a fork embracing my improvement; and Fig. 2, a similar view of one of the tines detached, the prong being represented as broken off. Fig. 3 represents a longitudinal horizontal section of the fork with the tines broken off, and Fig. 4 a vertical longitudinal section of the same. Fig. 5 represents an end view of the socket with the tines and handle removed.

My improvement consists in casting the ferrule fast to the socket and forming the latter with slots for the reception of the tangs of the tines of the fork and then securing the latter to the handle by means of screws, thus preventing both from being withdrawn from the socket, there being a wedge-shaped key cast on the outer end and inner side of the socket between the tines to prevent them from working loose.

To enable others skilled in the art to make, construct, and use my invention, I will now proceed to describe its parts in detail, reference being had to the drawings, and to the letters of reference marked thereon, in which the socket A is represented as having a ferrule, B, cast upon its outer end, and slots C formed in its sides, for the reception of the tangs of the tines D, the handle E and tines being securely attached to the socket by means of screws *a*. The orifices formed in the socket are countersunk for the reception of the heads of the screws, so as to present a smooth and clean surface. The handle E in this instance is also formed with slots for the admission of the inner edges of the tines for the purpose of rendering the whole strong and compact. The object of forming slots in the metal socket is to prevent lateral working of the tines, end working being also prevented by means of a wedge, F, cast between the openings in the socket for the tangs of the tines, the whole forming a chamber for each into which they exactly fit, thus giving to them all the benefit of a metallic bearing without materially increasing the weight of the socket. The end of the tine is cut down for a short distance to the depth of the thickness of the socket, to permit the tang to enter the slots and its inner end to pass between the socket and the handle, where they are all secured together by means of a screw passing through the socket and tang into the handle.

Having thus fully described my invention, what I claim as new, and desire to secure by Letters Patent, is—

Casting the ferrule B upon or otherwise securing it firmly to the outer end of a socket, A, in which are formed slots for the reception of the tangs of the tines of a fork, to prevent lateral working, when used in connection with a wedge cast or otherwise formed between the recesses made for the tangs to prevent end-play, and screws *a*, for the securing of the tines, socket, and handle to each other, substantially as set forth.

In testimony whereof I hereunto set my hand.

WILLIAM JONES.

Witnesses:
   JNO. CROSS,
   SAMUEL JONES.